United States Patent
Burger et al.

(10) Patent No.: US 6,695,904 B2
(45) Date of Patent: Feb. 24, 2004

(54) SURFACE COATING COMPOSITION COMPRISING SILICON COMPOUNDS

(75) Inventors: Rosemarie Burger, Inzlingen (DE); Jaroslaw Monkiewicz, Rheinfelden (DE); Roland Edelmann, Wehr (DE); Bjoern Borup, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 8 days.

(21) Appl. No.: 10/227,295

(22) Filed: Aug. 26, 2002

(65) Prior Publication Data

US 2003/0041779 A1 Mar. 6, 2003

(30) Foreign Application Priority Data

Aug. 25, 2001 (DE) .......................... 101 41 687

(51) Int. Cl.[7] ................... C09D 183/06; C09D 183/02; C08K 3/36; C08K 5/05; C08K 5/053
(52) U.S. Cl. .................................... 106/287.14
(58) Field of Search ..................... 106/282.14

(56) References Cited

U.S. PATENT DOCUMENTS

| | | | |
|---|---|---|---|
| 4,170,690 A | * 10/1979 | Armbruster et al. | 428/447 |
| 4,624,971 A | 11/1986 | van Tao et al. | |
| 5,013,788 A | * 5/1991 | Nagashima et al. | 524/767 |
| 5,223,030 A | * 6/1993 | Valette et al. | 106/38.2 |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,017,389 A | * 1/2000 | Schmidt et al. | 106/287.1 |
| 6,054,601 A | 4/2000 | Standke et al. | |
| 6,100,418 A | 8/2000 | Standke et al. | |
| 6,133,466 A | 10/2000 | Edelmann et al. | |
| 6,177,584 B1 | 1/2001 | Loewenberg et al. | |
| 6,228,936 B1 | 5/2001 | Standke et al. | |
| 6,239,194 B1 | 5/2001 | Standke et al. | |
| 6,245,833 B1 | * 6/2001 | Kang et al. | 523/203 |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,500,883 B1 | 12/2002 | Mack et al. | |
| 6,528,585 B1 | 3/2003 | Standke et al. | |
| 6,534,667 B1 | 3/2003 | Standke et al. | |

* cited by examiner

*Primary Examiner*—David Brunsman
(74) *Attorney, Agent, or Firm*—Oblon, Spivak, McClelland, Maier & Neustadt, P.C.

(57) ABSTRACT

A composition which retains a flash point of more than 21° C. even on storage and is obtainable by mixing and reacting (i) from 50 to 70% by weight of at least one alkyltrialkoxysilane, (ii) from 10 to 25% by weight of at least one alkoxysiloxane and/or at least one tetraalkoxysilane, (iii) from 15 to 25% by weight of at least one aqueous silica sol, (iv) from 0.1 to 5% by weight of at least one acid, and (v) from 0.1 to 60% by weight of at least one alcohol and/or glycol, the sum of the above components being not more than 100% by weight, by introducing components (i) and (ii) and also, if desired, a fraction of component (v) as an initial charge, adding component (iii), adjusting the mixture to a temperature in the range from −5 to 10° C., and subsequently adding component (iv), then allowing the mixture to continue reacting, thereafter distilling off hydrolysis alcohol under reduced pressure, and replacing it by adding component (v); which composition is useful for producing a coating on surfaces and also as a base material for paints; a process for preparing such a composition; and coatings and articles obtainable by applying such a composition.

22 Claims, No Drawings

SURFACE COATING COMPOSITION COMPRISING SILICON COMPOUNDS

BACKGROUND OF THE INVENTION

1. Field of the Invention

The present invention relates to a composition comprising silicon compounds which is used essentially for producing a coating on surfaces and also as a base material for paints. The present invention further relates to a process for preparing such a composition. The invention additionally relates to coatings and articles obtainable by applying such a composition or a corresponding formulation.

2. Description of the Background

Organofunctional silanes and siloxanes are widely used for modifying surface properties: for example, as adhesion promoters, as binders, or for imparting water, oil or dirt repellancy properties to a surface.

Accordingly, organofunctional silanes and silica sols are part of numerous solventborne or aqueous formulations, such as in compositions for coating surfaces, such as topcoats, paints or anticorrosion compositions, to give but a few examples.

A coating may have the effects, inter alia, of improving the resistance of a substrate to external influences and of preserving the visual appearance or altering it in some desirable way. For instance, substrates sensitive to scratching, in particular, are provided with a more or less scratchproof coating through the application, for example, of paint to iron, steel, aluminum, copper, silver, magnesium, zinc, tin, nickel or alloys based, for example, on magnesium/aluminum. Additionally, metals or other substrates, such as ceramic, brick, glass, artificial stone, and plastics are coated to improve their corrosion resistance, weathering stability, or properties of repelling bioorganisms.

The requirements imposed on such a coating are generally stringent, especially as regards elasticity, impact strength, scratch resistance, UV and chemical resistance, gloss retention, surface quality—particularly visual appearance—and, not least, in respect of economics—particularly as regards ease of processing, duration of processing, consumption of material, emissions, and/or flash point. Examples of desirable features are low coat thicknesses, effective and durable attachment, easy and effective processing of the coating composition, and stability of the composition on storage. It is frequently observed, however, that the coating—especially on a highly elastic or ductile material, such as aluminum or copper—is unable to conform to the material properties of the substrate, and the coating ruptures or even flakes off. In many cases it is necessary, before a coating is applied, to subject the substrates to a complex pretreatment, by passivating, phosphating, chromating, sputtering, etc., for example. Additionally, and particularly with aqueous coating compositions, the resulting surface qualities are not always satisfactory. On the other hand, coating compositions containing ethanol, in particular, possess a very low flash point, so that their transportation, storage, and processing entail compliance with special conditions, which are usually complicated and costly. The aim generally is for a coating which is thin, smooth, adheres well, is elastic, incombustible where appropriate, stable toward UV, and also, where appropriate, is extremely easy to produce.

DE 197 15 940 A1 discloses a process for preparing a ceramic composition which is intended for application as a layer on a support material and which comprises as its components from 25 to 28% ceramic particles, especially silica, alumina, zirconium oxide, silicon carbide, silicon nitride, and from 5 to 12% pigment, in each case with a particle size of from 0.5 to $1\mu$ as filler, from 30 to 40% binders, such as metal oxides, hydrolysates and/or condensation/polymerization products of metal alkoxides, such as methoxy, ethoxy or butoxy, of aluminum, silicon, tin, titanium or zirconium, and also silicates, zirconium salts, phosphates, organic metal oxides, and the like, and from 30 to 40% alcohol, especially isopropanol, as solvent. In the preparation, the particulate solids are dispersed with the solvent in a 1:1 ratio in a boremill, after which the dispersion is admixed with the binder in the sol state in a 6:4 ratio and stirred under well-defined conditions. This preparation process is very complex.

Similar compositions comprising silicon compounds for sol-gel coatings, as foundry binders, for producing glass layers for anodic bonding, for producing structured inorganic layers, for producing composite materials or for protecting a metallic substrate from corrosion are disclosed, for example, in DE 44 17 405 A1, EP 0 830 324 B1, EP 0 842 967 A2, DE 196 47 369 A1, DE 198 13 709 A1 or WO 98/22241.

In addition, DE 198 14 605 A1 discloses a water-based anticorrosion composition for sealing metallic substrates which is composed of an aqueous dispersion (a) of at least one silane derivative, particularly a glycidyloxy-functional or terminally diol-functional alkoxysilane derivative, and (b) of a colloidal silica and/or a colloidal silicate. Preferred compositions are those which are substantially free from organic solvents, although hydrolysis alcohol or other alcohol, such as propanol, is not ruled out as an additional component.

A drawback of all of these coating compositions is their flash point, which is <21° C., which comes about through the formation of alcohols as a byproduct in the partial hydrolysis of the monomeric alkoxysilanes, remaining in the formulation as a solvent. The low flash point necessitates additional, and usually costly, measures for observing the statutory provisions, particularly for transportation, storage, and in connection with the industrial processing of the coating compositions, in the coil coating process, for example. Since effective filming and adhesion of the coating require the addition of further solvents, the solids content of the coating compositions is often relatively low as well, usually less than 35% by weight.

SUMMARY OF THE INVENTION

It is an object of the present invention to provide a composition for coating substrates which features a flash point of more than 21° C., a high solids content combined with sufficient stability on storage, and, on application, coatings having a good surface quality.

This object is achieved in accordance with the invention with a composition comprising a reaction mixture of
  (i) at least one alkyltrialkoxysilane,
  (ii) at least one alkoxysiloxane or at least one tetraalkoxysilane, or a mixture thereof,
  (iii) at least one water-containing silica sol,
  (iv) at least one acid, and
  (v) at least one alcohol or at least one glycol, or a mixture thereof, wherein component (v) has a flash point >21° C.

It has surprisingly now been found that a composition possessing substantial stability on storage, preferably 6 months, while retaining a flash point of more than 21° C. is obtainable by mixing and reacting (i) at least one alkyltrialkoxysilane, preferably from 50 to 70% by weight, (ii) at least one alkoxysiloxane and/or at least one tetraalkoxysilane, preferably from 10 to 25% by weight, (iii) at least one aqueous silica sol, preferably having an $SiO_2$ content of from 20 to 50% by weight, (iv) at least one acid, preferably from 0.1 to 5% by weight, and (v) at least one alcohol or at least one glycol or a corresponding mixture, especially 1-methoxypropanol, n-propanol, n-butanol, ethylene glycol, butyl glycol or tert-amyl alcohol or a mixture of n-butanol and n-butyl glycol (for example, a mixture containing from 1 to 20% by weight n-butyl glycol), component (v) appropriately having a flash point >21° C., preferably ≧25° C., with particular preference >25° C., with very particular preference ≧30 to 50° C.; preference is further given to from 0.1 to 60% by weight of component (v), the sum of the above components being 100% by weight and the fraction for the aqueous silica sol resulting preferably from the necessary amount of hydrolysis water, in a simple arid economic way by introducing components (i) and (ii) and also, if desired, a fraction of component (v) as an initial charge, adding component (iii), adjusting the mixture to a temperature in the range from −5 to 10° C., and subsequently adding component (iv), likewise with stirring, then allowing the mixture to continue reacting, thereafter distilling off hydrolysis alcohol under reduced pressure, preferably at least 80% by weight, with particular preference from 85 to 99% by weight, with very particular preference from 90 to 95% by weight, and replacing it by adding component (v).

DETAILED DESCRIPTION OF THE INVENTION

An appropriate procedure here is, where appropriate with cooling, to introduce first components (i) and (ii) and also, if desired, a fraction of component (v) with cooling, as an initial charge, to add component (iii), to adjust the mixture to a temperature in the range from −5 to 20° C., preferably in the range from −2 to 10° C., with stirring, and subsequently to add component (iv) with vigorous stirring, at which point the temperature rises; then to allow the mixture to continue reacting, thereafter to distill off preferably up to 95% by weight of the hydrolysis alcohol under reduced pressure, and to replace it by adding component (v). This is followed by distillation of an azeotropic mixture of the remaining hydrolysis alcohol with simultaneous addition of component (v) until, according to GC, preferably not more than 17 area percent of hydrolysis alcohol, especially ethanol, are still present in the fraction.

In this way it is possible advantageously to obtain a composition which is produced as a clear or opalescent liquid having a viscosity of approximately 10 mPa·s (DIN 53015) and possesses a flash point of more than 21° C. and which, furthermore, is easy and economic to process while at the same time providing high-quality coatings having excellent adhesion to substrates, such as aluminum, iron, which may also be galvanized, phosphated or chromated.

The present composition also exhibits good storage properties within a storage time of 6 months.

Furthermore, the present composition also affords outstanding processing by the coil coating process with thermal curing. At temperatures in the range from 180 to 240° C., the coating can cure within a few seconds to several minutes.

Furthermore, the present composition is also outstandingly suitable for use as a base material for the preparation of paints, for scratchproofing applications for example.

Additionally, the present composition lends itself outstandingly well to use as a paint base material for formulating organically or inorganically modified inorganic sol-gel clearcoat materials or pigmented paints with the addition of further paint base materials, paint additives, such as light stabilizers, free-radical scavengers, crosslinking catalysts, film-forming auxiliaries, leveling agents, emulsifiers, and solvents, e.g. high boilers, also with the addition of inorganic pigments and fillers; it may be used, for example, for protective coats possessing good scratch, abrasion, and chemical resistance.

The present invention accordingly provides a composition comprising a reaction mixture, i.e., as reactant components, (i) at least one alkyltrialkoxysilane, (ii) at least one alkoxysiloxane and/or at least one tetraalkoxysilane, (iii) at least one water-containing silica sol, (iv) at least one acid, and (v) at least one alcohol or at least one glycol or a mixture thereof, component (v) having a flash point >21° C.

The present invention further provides a composition obtainable by mixing and reacting (i) from 50 to 70% by weight of at least one alkyltrialkoxysilane, (ii) from 10 to 25% by weight of at least one alkoxysiloxane and/or at least one tetraalkoxysilane, (iii) from 15 to 25% by weight of at least one aqueous silica sol, (iv) from 0.1 to 5% by weight of at least one acid, and (v) from 0.1 to 60% by weight of at least one alcohol and/or glycol, the sum of the above components being not more than 100% by weight, by introducing components (i) and (ii) and also, if desired, a fraction of component (v) as an initial charge, adding component (iii), adjusting the mixture to a temperature in the range from −5 to 10° C., and subsequently adding component (iv), likewise with stirring, then allowing the mixture to continue reacting, thereafter distilling off hydrolysis alcohol under reduced pressure, preferably at least 80% by weight, with particular preference from 85 to 99% by weight, with very particular preference from 90 to 95% by weight, especially if the hydrolysis alcohol per se has a flash point of <21° C., suitably of <24° C., and replacing it at least fractionally by adding component (v).

Accordingly, the present invention also provides a process for preparing a composition of the invention, which process comprises introducing components (i) and (ii) and also, if desired, a fraction of component (v), as an initial charge, adding component (iii), adjusting the mixture to a temperature in the range from −5 to 10° C. and subsequently adding component (iv), then allowing the mixture to continue reacting, thereafter distilling off hydrolysis alcohol under reduced pressure and replacing this fraction, in the same degree as the removal of hydrolysis alcohol and water from the system, by adding component (v).

In the process of the invention, as component (i) of the reaction mixture, it is preferred to employ at least one alkyltrialkoxysilane of the general formula I

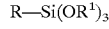

(I)

in which R is a linear, branched or cyclic alkyl group having from 1 to 16 carbon atoms and $R^1$ is a methyl, ethyl, 1-methoxyethyl, 2-methoxyethyl, 1-methoxypropyl, 2-methoxypropyl, alkyl polyether, especially corresponding esters of ethyl glycol, butyl glycol, tert-amyl, n-propyl, isopropyl, n-butyl or isobutyl group.

Particular preference is given to methyltrimethoxysilane, methyltriethoxysilane, isopropyltrimethoxysilane, isopropyltriethoxysilane, n-propyltrimethoxysilane, and n-propyltriethoxysilan.

As component (ii) of the reaction mixture in the process of the invention it is preferred to employ at least one alkoxysiloxane of the general formula II

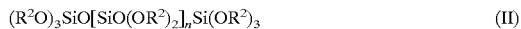
$$(R^2O)_3SiO[SiO(OR^2)_2]_nSi(OR^2)_3 \qquad (II)$$

in which the groups $R^2$ are identical or different and $R^2$ is a hydrogen atom, a methyl, ethyl, 1-methoxyethyl, 2-methoxyethyl, 1-methoxypropyl, 2-methoxypropyl, n-propyl, isopropyl, n-butyl, isobutyl, tert-amyl or alkyl polyether group, especially resultant esters of ethyl glycol, butyl glycol, and the average degree of oligomerization n is a number from 0 to 50, preferably from 1 to 30, an example being an ethyl silicate such as DYNASIL® 40, or at least one tetraalkoxysilane of the general formula III

$$Si(OR^3)_4 \qquad (III)$$

in which the groups $R^3$ are identical or different and $R^3$ is a hydrogen atom, a methyl, ethyl, n-propyl, isopropyl, n-butyl, isobutyl, tert-amyl, 1-methoxyethyl, 2-methoxyethyl, 1-methoxypropyl, 2-methoxypropyl, alkyl polyether group, especially corresponding esters of ethyl glycol, butyl glycol, an example being tetraethoxysilane, or a mixture of at least one alkoxysilane of the general formula II and at least one tetraalkoxysilane of the general formula III.

In the process of the invention as component (iii) use is further made of at least one aqueous silica sol from the following series:

(a) anionic or cationic silica sol having an $SiO_2$ content of from 30 to 50% by weight, a colloid particle size of from 6 to 50 nm and a surface area of from 50 to 300 m²/g, a sol pH of from 8 to 11 and a viscosity at 25° C. of less than 45 mPa·s, examples being Ludox® HS 40, Levasil® 200/30, Snowtex® ST-O33, Köstrosol® 3530, Köstrosol® 3550, Nyacoll® 9950, or (b) acidic silica sol having an $SiO_2$ content of from 20 to 50% by weight, a colloid particle size from 10 to 50 nm and a surface area of from 100 to 300 m²/g, a sol pH of from 2 to 5 and a viscosity of less than 10 mPa·s, an example being Levasil® 200S/30.

As component (iv) of the reaction mixture in the process of the invention it is preferred to employ at least one aqueous or concentrated acid from the group consisting of sulfuric acid, nitric acid, hydrochloric acid, i.e., hydrogen chloride, phosphoric acid, and acetic acid.

The present invention additionally provides for the use of the composition of the invention or a composition prepared in accordance with the invention for the coating of substrates.

Thus the composition of the invention is used preferably for the coating of metallic surfaces, examples being surfaces of magnesium, aluminum, tin, zinc, copper, silver, nickel, iron, steel, alloys, especially nonferrous metal alloys, or for the coating of surfaces of wood or of the surfaces of plastics, an example being PVC.

The composition of the invention may also be used advantageously as a base material for the preparation of a paint.

Accordingly, the present invention also provides a paint prepared using as ingredient a composition of the invention.

The present invention likewise provides a coating obtainable using a composition of the invention or a paint of the invention. The application of the inventive composition or paint to a substrate, particularly an article to be treated, which is composed, for example, of one of the abovementioned substrates, may generally take place without pretreatment, provided the surface to be treated is substantially free from deposits, such as dust or grease. The composition or paint of the invention is applied, for example, by spraying, brushing, dipping, and a subsequent drying, preferably at a relatively high temperature, in particular at from 180 to 240° C., the coating of the invention curing rapidly and being able, advantageously, to attach to the surface of the substrate.

The present invention therefore also provides articles having a coating of the invention.

In general, the composition of the invention may be prepared by controlled partial hydrolysis and condensation of alkylalkoxysilanes and alkoxysilanes and/or alkoxysiloxanes in the presence of aqueous silica sol and substantially replacing the hydrolysis alcohol by an alcohol or glycol or a corresponding mixture of alcohols and/or glycol, component (v) having a flash point of significantly more than 21° C. The silanols formed in the controlled hydrolysis may undergo condensation with one another to form Si—O—Si structures, but may also undergo condensation with OH groups on the surface of the $SiO_2$ nanoparticles of the silica sol. In this way it is generally possible for a low molecular mass, oligomeric, inorganic-organic network to be formed which in the process of gel formation in the coating cures right through to give a mechanically stable network.

As is also evident from the examples, it is possible in this way to prepare, advantageously, formulations having a flash point of preferably from 24 to 38° C., in particular from 30 to 38° C. The flash point is determined essentially in accordance with the procedures of ISO 2919 (Pensky-Martens), EN 22719 (Pensky-Martens) or DIN 51 755 (Abel-Pensky). The solids content in a composition of the invention may be adjusted by way of the amount of component (v) added, particularly 1-methoxypropanol, n-butanol, ethyl glycol and/or butyl glycol, advantageously up to 46% by weight, in particular in the range from 40 to 46% by weight, in which case it is possible advantageously to achieve a storage stability of approximately 6 months. The amount of said solids in the present formulations is generally determined by evaporating the solvent (for around 1 hour at 125° C.). The determination of the solids content takes place substantially in accordance with DIN ISO 3251. Accordingly, said solids content generally corresponds to the coating which remains on the substrate on application.

The solids content is suitably ≦50% by weight, based on the composition of the invention, such compositions being stable on storage, with substantially the same properties, for generally up to 6 months. The solids content is preferably from 30 to 48% by weight, with particular preference from 39 to 46% by weight, with very particular preference from 42 to 44% by weight. It is, however, also possible for compositions of the invention to have a higher solids content; in that case, however, the tendency toward gel formation rises.

Accordingly, the composition of the invention features a flash point above 21° C., a comparatively high solids content, and sufficient stability on storage. Furthermore, the composition of the invention is outstandingly suitable per se or as a base material for a paint for the coating of substrates. In that utility, it is possible to obtain coatings and/or articles having an excellent surface quality.

The present invention is illustrated by the following examples, without restricting the subject matter of the invention:

EXAMPLES

Example 1

A suitable reaction vessel was charged with 620 parts by weight of methyltriethoxysilane and 181 parts by weight of tetraethoxysilane, and 185 parts by weight of a 50% silica sol (Köstrosol® 3550) were added. The silane/silica sol mixture was cooled to 5° C. with stirring and then 13 parts by weight of 37% sulfuric acid were added. After about 10 minutes the hydrolysis of the silanes began and the temperature rose within 10 minutes to 38° C. The reaction mixture was stirred with cooling at 20° C. for 1 hour, and then 430 parts by weight of ethanol were distilled off in vacuo at 40° C. The distillation was terminated and 430 parts by weight of 1-methoxypropanol were added. The distillation was then continued in vacuo at 40° C., giving an azeotropic mixture of ethanol and 1-methoxypropanol. At the same time; 1-methoxypropanol was added dropwise, and the distillation was ended when the residual amount of ethanol in the fraction was approximately 17 GC area percent. The reaction mixture was cooled and adjusted to a solids content of 45% by weight with 1-methoxypropanol. This gave a milky white product with a small amount of sediment, which was easy to stir up.
Flash point: 38° C.

Example 2

A suitable reaction vessel was charged with 620 parts by weight of methyltriethoxysilane and 181 parts by weight of tetraethoxysilane, and 185 parts by weight of a 50% silica sol were added. The silane/silica sol mixture was cooled to 5° C. with stirring and then 13 parts by weight of 37% sulfuric acid were added. After about 10 minutes the hydrolysis of the silanes began and the temperature rose within 10 minutes to 35° C. The reaction mixture was stirred with cooling at 20° C. for 1 hour, and then 430 parts by weight of ethanol were distilled off in vacuo at 40° C. The distillation was terminated and 430 parts by weight of 1-methoxypropanol were added. The reaction mixture was cooled and adjusted to a solids content of 43% by weight with 1-methoxypropanol. This gave a milky white product with a small amount of sediment, which was easy to stir up.
Flash point: 24° C.

Example 3

A suitable reaction vessel was charged with 620 parts by weight of methyltriethoxysilane and 181 parts by weight of tetraethoxysilane, and 185 parts by weight of a 50% silica sol were added. The silane/silica sol mixture was cooled to 5° C. with stirring and then 13 parts by weight of 37% sulfuric acid were added. After about 10 minutes the hydrolysis of the silanes began and the temperature rose within 10 minutes to 35° C. The reaction mixture was stirred with cooling at 20° C. for 1 hour, and then 200 parts by weight of 1-methoxypropanol were added. Owing to the large amount of hydrolysis ethanol, the reaction mixture had a solids content of only 28% by weight. This gave a milky white product with a small amount of sediment, which was easy to stir up.
Flash point: 14° C.

Example 4

A suitable reaction vessel was charged with 620 parts by weight of methyltriethoxysilane and 181 parts by weight of tetraethoxysilane, and 185 parts by weight of a 50% silica sol were added. The silane/silica sol mixture was cooled to 1° C. with stirring and then 13 parts by weight of 37% sulfuric acid were added. After about 5 minutes the hydrolysis of the silanes began and the temperature rose within 6 minutes to 42° C. The reaction mixture was stirred with cooling at 20° C. for 1 hour, and then 330 parts by weight of ethanol were distilled off in vacuo at 40° C. The distillation was terminated and a further 100 parts by weight of ethanol were distilled off. Following termination of the distillation in vacuo, 250 parts by weight of n-butanol were added. The reaction mixture was cooled and adjusted to a solids content of 45% by weight with n-butanol. This gave a milky white product with a very small amount of sediment, which was easy to stir up.
Flash point: 34° C.

Comparative Example A

The procedure of Example 1 was repeated but without the removal of hydrolysis alcohol and the addition of a further solvent; i.e., the only solvent present was ethanol from the hydrolysis. The flash point of the composition prepared in this way was determined as being 12 to 13° C.

Comparative Example B

The procedure of Example 1 was repeated except that isopropanol was used instead of 1-methoxypropanol. The composition prepared in this way had a flash point of 13° C.

The disclosure of priority application, German 10141687.3, filed Aug. 25, 2001, is hereby incorporated by reference.

What is claimed is:

1. A composition comprising a reaction mixture of
   (i) at least one alkyltrialkoxysilane,
   (ii) at least one alkoxysiloxane or at least one tetraalkoxysilane, or a mixture thereof,
   (iii) at least one water-containing silica sol,
   (iv) at least one acid, and
   (v) at least one alcohol or at least one glycol, or a mixture thereof, wherein component (v) has a flash point >21° C.

2. The composition as claimed in claim 1, wherein the at least one alkyltrialkoxysilane has the general formula I $$R-Si(OR^1)_3 \qquad (I)$$

in which R is a linear, branched or cyclic alkyl group having from 1 to 16 carbon atoms and $R^1$ is a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group.

3. The composition as claimed in claim 1, wherein the at least one alkoxysiloxane has the general formula II $$(R^2O)_3SiO[SiO(OR^2)_2]_nSi(OR^2)_3 \qquad (II)$$

in which the groups $R^2$ are identical or different and are a hydrogen atom, a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group, and the average degree of oligomerization n is a number from 0 to 50.

4. The composition as claimed in claim 1, wherein the at least one tetraalkoxysilane has the general formula III $$Si(OR^3)_4 \qquad (III)$$

in which the groups $R^3$ are identical or different and are a hydrogen atom, a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group.

5. The composition as claimed in claim 1, comprising the at least one alkoxysiloxane and the at least one tetraalkoxysilane.

6. The composition as claimed in claim 1, wherein the at least one aqueous silica sol comprises:
   (a) an anionic or cationic silica sol having an $SiO_2$ content of from 30 to 50% by weight, a colloid particle size of from 6 to 50 nm and a surface area of from 50 to 300 $m^2/g$, a sol pH of from 8 to 11 and a viscosity at 25° C. of less than 45 mPa·s, or
   (b) an acidic silica sol having an $SiO_2$ content of from 20 to 50% by weight, a colloid particle size from 10 to 50 nm and a surface area of from 100 to 300 $m^2/g$, a sol pH of from 2 to 5 and a viscosity of less than 10 mPa·s.

7. The composition as claimed in claim 1, wherein the at least one acid is an aqueous or concentrated acid selected from the group consisting of sulfuric acid, nitric acid, hydrochloric acid, acetic acid, and phosphoric acid.

8. A composition obtainable by mixing and reacting
   (i) from 50 to 70% by weight of at least one alkyltrialkoxysilane,
   (ii) from 10 to 25% by weight of at least one alkoxysiloxane or at least one tetraalkoxysilane, or a mixture thereof,
   (iii) from 15 to 25% by weight of at least one aqueous silica sol,
   (iv) from 0.1 to 5% by weight of at least one acid, and
   (v) from 0.1 to 60% by weight of at least one alcohol or at least one glycol, or a mixture thereof, wherein component (v) has a flash point >21° C.,
   the sum of the above components being not more than 100% by weight,
   by introducing components (i) and (ii) and also, optionally, a fraction of component (v) as an initial charge, to form a mixture, adding component (iii), adjusting the mixture to a temperature in the range from −5 to 10° C., and subsequently adding component (iv), then allowing the mixture to continue reacting, thereafter distilling off hydrolysis alcohol, and replacing it by adding component (v).

9. The composition as claimed in claim 8, wherein the at least one alkyltrialkoxysilane has the general formula I $$R\text{—}Si(OR^1)_3 \qquad (I)$$

in which R is a linear, branched or cyclic alkyl group having from 1 to 16 carbon atoms and $R^1$ is a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group.

10. The composition as claimed in claim 8, wherein the at least one alkoxysiloxane has the general formula II $$(R^2O)_3SiO[SiO(OR^2)_2]_nSi(OR^2)_3 \qquad (II)$$

in which the groups $R^2$ are identical or different and are a hydrogen atom, a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group, and the average degree of oligomerization n is a number from 0 to 50.

11. The composition as claimed in claim 8, wherein the at least one tetraalkoxysilane has the general formula III $$Si(OR^3)_4 \qquad (III)$$

in which the groups $R^3$ are identical or different and are a hydrogen atom, a methyl, ethyl, 1-methoxyethyl, 2-methoxyethyl, 1-methoxypropyl, 2-methoxypropyl, alkyl polyether, tert-amyl, n-propyl, isopropyl, n-butyl or isobutyl group.

12. The composition as claimed in claim 8, comprising the at least one alkoxysiloxane and the at least one tetraalkoxysilane.

13. The composition as claimed in claim 8, wherein the at least one aqueous silica sol comprises:
   (a) an anionic or cationic silica sol having an $SiO_2$ content of from 30 to 50% by weight, a colloid particle size of from 6 to 50 nm and a surface area of from 50 to 300 $m^2/g$, a sol pH of from 8 to 11 and a viscosity at 25° C. of less than 45 mPa·s, or
   (b) an acidic silica sol having an $SiO_2$ content of from 20 to 50% by weight, a colloid particle size from 10 to 50 nm and a surface area of from 100 to 300 $m^2/g$, a sol pH of from 2 to 5 and a viscosity of less than 10 mPa·s.

14. The composition as claimed in claim 8, wherein the at least one acid is an aqueous or concentrated acid selected from the group consisting of sulfuric acid, nitric acid, hydrochloric acid, acetic acid, and phosphoric acid.

15. A process for preparing a composition as claimed in claim 8, which comprises introducing components (i) and (ii) and also, optionally, a fraction of component (v), as an initial charge, to form a mixture, adding component (iii), adjusting the mixture to a temperature in the range from −5 to 10° C. and subsequently adding component (iv), then allowing the mixture to continue reacting, thereafter distilling off hydrolysis alcohol under reduced pressure and replacing it by adding component (v).

16. A process comprising formulating a paint with the composition prepared as claimed in claim 15 as a base material.

17. A paint prepared by the process claimed in claim 16.

18. A process comprising coating a substrate with the composition as claimed in claim 8.

19. The process as claimed in claim 18, wherein the substrate is selected from the group consisting of metals, wood and plastics.

20. The process as claimed in claim 19, wherein the substrate is a metal selected from the group consisting of magnesium, aluminum, tin, zinc, copper, silver, nickel, iron, steel and nonferrous metal alloys.

21. A coating obtainable from the composition as claimed in claim 8.

22. An article comprising a substrate coated with the composition as claimed in claim 8.

* * * * *